No. 650,779. Patented May 29, 1900.
W. CAIRNS.
CHAINLESS BICYCLE.
(Application filed Apr. 21, 1899.)
(No Model.) 2 Sheets—Sheet 1.
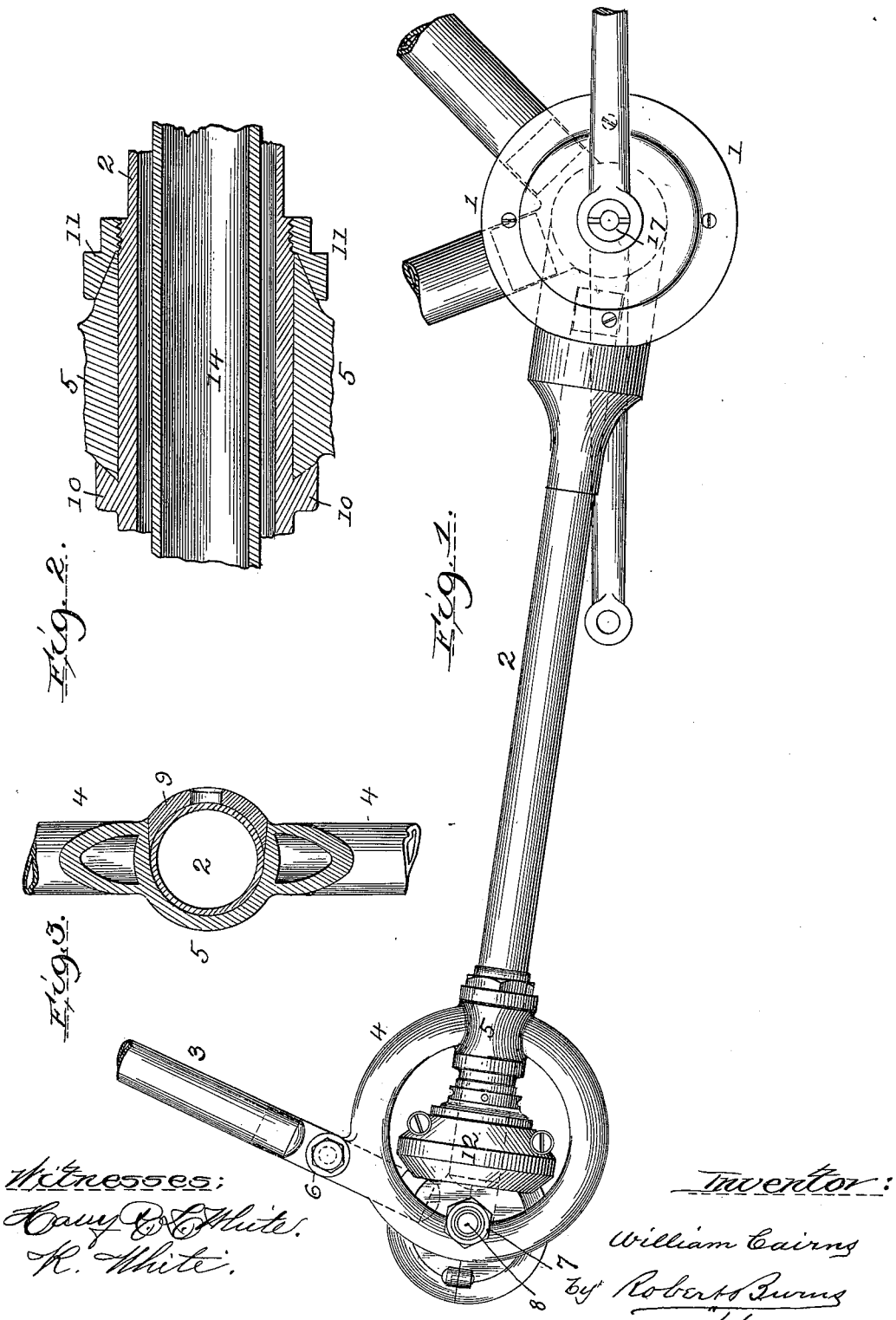

No. 650,779. Patented May 29, 1900.
W. CAIRNS.
CHAINLESS BICYCLE.
(Application filed Apr. 21, 1899.)

(No Model.) 2 Sheets—Sheet 2.

Witnesses:
Harry D. L. White
R. White

Inventor
William Cairns
By Robert Burns Attorney.

THE NORRIS PETERS CO., PHOTO-LITHO., WASHINGTON, D. C.

United States Patent Office.

WILLIAM CAIRNS, OF CHICAGO, ILLINOIS, ASSIGNOR TO THE MONARCH CYCLE MANUFACTURING COMPANY, OF SAME PLACE.

CHAINLESS BICYCLE.

SPECIFICATION forming part of Letters Patent No. 650,779, dated May 29, 1900.

Application filed April 21, 1899. Serial No. 713,954. (No model.)

*To all whom it may concern:*

Be it known that I, WILLIAM CAIRNS, a citizen of the United States, residing at Chicago, in the county of Cook and State of Illinois, have invented certain new and useful Improvements in Chainless Bicycles; and I do hereby declare the following to be a full, clear, and exact description of the same, reference being had to the accompanying drawings, forming a part of this specification.

The present invention relates to that class of bicycle driving-gear in which the pedal-shaft has operative connection with the rear driving-wheel by means of a counter-shaft and bevel-gear connections.

The objects of the present improvements are, first, to provide a simple and efficient connecting-bracket for the rear fork ends of the main frame, which is capable of ready and convenient lateral detachment in the operations of taking the driving mechanism apart for cleaning, repairing, and the like, and in the subsequent reassemblage of the parts; second, to provide a convenient and effective means for attaching the laterally-detachable bracket in place upon the rear end of the lower rear fork member of the frame. I attain such objects by the construction and formation of parts illustrated in the accompanying drawings, in which—

Figure 4:
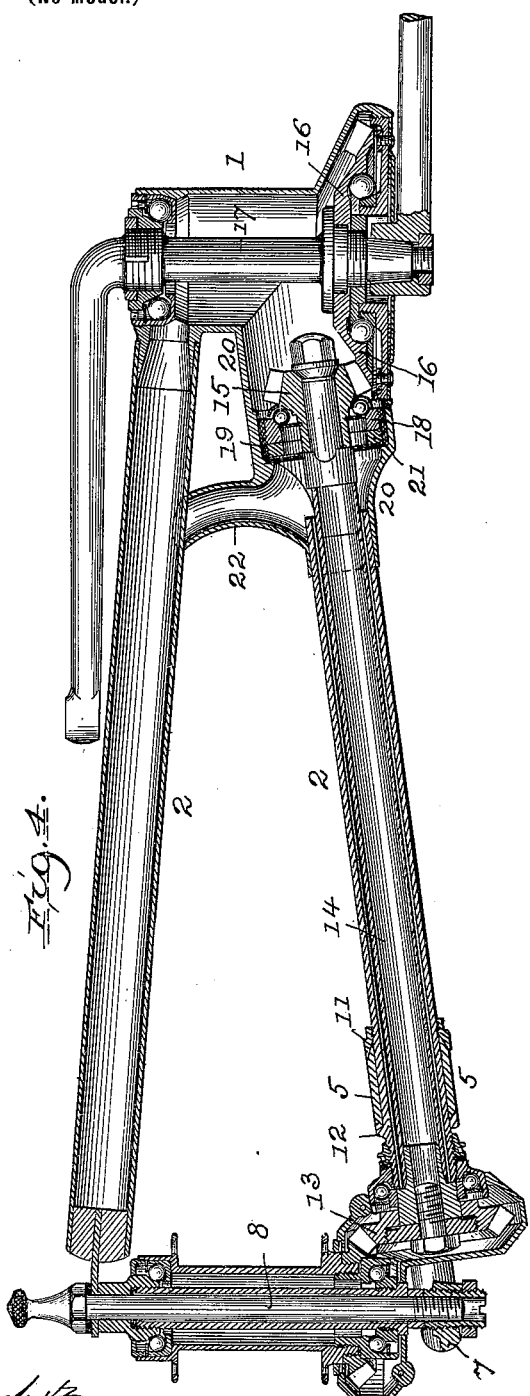
Figure 6:
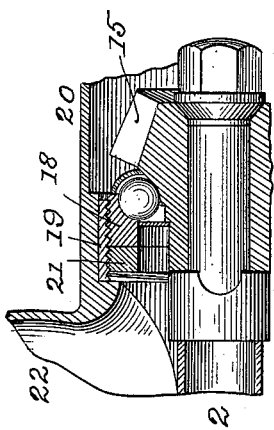
Figure 5:
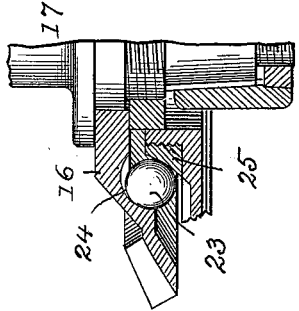

Figure 1 is a detail side elevation of the rear portion of a chainless bicycle, illustrating the present invention; Fig. 2, an enlarged detail longitudinal section illustrating the attachment of the rear-fork bracket to the lower rear fork of the cycle-frame; Fig. 3, a transverse section of the same; Fig. 4, a detail horizontal sectional elevation of the rear portion of a chainless bicycle, illustrating the present invention; Fig. 5, an enlarged detailed sectional elevation illustrating the ball-bearing support for the bevel driving gear-wheel of the pedal or crank shaft of the mechanism; Fig. 6, a similar view illustrating the ball-bearing support for the rear end of the counter-shaft and its driving bevel-pinion.

Similar numerals of reference indicate like parts in the several views.

Referring to the drawings, 1 represents the hanger-barrel of the bicycle, 2 the lower rear forks, and 3 a portion of the upper rear forks, the adjacent rear ends of which forks are connected together by a connecting-bracket 4, that forms the axle-support of the rear or driving wheel of the bicycle. In the present improvement this connecting-bracket comprises a loop-shaped main or body portion 4 of any suitable geometric form, preferably that of a circular ring, as shown in Fig. 1. Such body portion 4 is provided with an intersecting attaching sleeve or socket 5, adapted to embrace and have engagement with the rear portions of the lower rear fork member 2, to which it is rigidly clamped, preferably in the manner hereinafter set forth. The connecting-bracket 4 is also provided on its crown portion with an upwardly-extending lug 6 for the attachment of the lower end of the upper rear fork member 3, and at its rear end with a bearing-lug or enlargement 7, that is bored transversely to receive the axle 8 of the rear driving-wheel.

Another part of the present invention consists in forming the attaching-sleeve 5 of the connecting-bracket 4 of an open-sided nature, as shown in Fig. 3, so as to enable the attaching-sleeve to be slipped into place in a lateral direction or manner upon the rear fork, and such rear fork will be reinforced at such point by a side reinforce 9 to impart a circular form of the joint. The attaching-sleeve 5 is held from lateral disengagement and at the same time clamped firmly in place by the following construction of the parts:

10 is a fixed collar, and 11 an adjustable collar upon the rear-fork tube 2, the opposing ends of which collars are undercut, as shown in Fig. 2, to form annular recesses, which are adapted to engage the correspondingly-formed ends of the attaching-sleeve 5 when the adjustable collar 11 is screwed toward the fixed collar 10 to effect an attachment of the connecting-bracket 4 in place. With such construction and arrangement of parts a substantial and effective attachment of the parts is attained and which at the same time permits of a ready and convenient detachment when required.

With the present construction of attaching-bracket 4, as heretofore described, the space within the ring member thereof permits of the convenient arrangement therein of that portion of the gear-casing 12 that incloses the bevel-pinion 13 on the rear end of the counter-shaft 14 of the driving mechanism. At its rear end the counter-shaft 14 is supported in any usual arrangement of ball-bearings in the hub portion of the gear-casing 12, no novelty being claimed for the construction shown in the drawings in this connection. At its forward end it is supported in ball-bearings, as hereinafter more particularly described, and carries a bevel-pinion 15, that gears with and is driven by the bevel gear-wheel 16 on the crank or pedal shaft 17 of the bicycle.

The ball-bearing support for the forward end of the counter-shaft 14 comprises a runway or ball-cone formed on the back of the bevel-pinion 15, as shown more particularly in Fig. 6, a series of balls, and a ball-cup 18, the periphery of which is screw-threaded to fit the screw-threaded bore of a sleeve 19, the periphery of which is of a plane cylindrical form, so as to adapt the same to fit snugly the socket formed therefor in the rearward extension 20 of the hanger-barrel, and which rearward extension is also adapted to incase the bevel-pinion 15, as illustrated in Figs. 4 and 6.

21 is a screw-threaded ring or nut fitting the screw-threaded bore of the sleeve 19 behind the ball-cup 18 and acting as a lock-nut therefor to secure the same at its required adjustment, and when so desired the usual pilot-washer may be interposed between the nut 21 and the ball-cup 18 to prevent the final adjustment of such lock-nut affecting the previous and proper adjustment of the ball-cup 18. With such construction a very effective and active alinement and adjustment of the parts can be attained in that the construction described enables the maker to attain an accurate construction and adjustment of ball-cup and its parts before the same is inserted in the cylindrical bore or socket therefor in the frame of the machine. With a view to better preserve the proper alinement of such bore or socket another part of the present improvement consists in providing the rearward extension 20 of the hanger-barrel with a lateral tubular extension 22, that is adapted to be brazed or otherwise secured to the opposite rear fork member to afford a strong and substantial means for maintaining the aforesaid socket for the ball-cup in proper alinement with the other portions of the mechanism.

At one end the crank-shaft 17 is supported in the usual ball-bearings in the barrel-hanger 1, while at the end carrying the driving bevel-wheel 16 the same is supported by a series of balls 23, that have their raceway or track formed by a circular recess 24 in the back of such wheel immediately inside the rim portion thereof, on which are formed the bevel-teeth, the ball-cone 25 being carried by an annular inward extension on the end cap of expanded portion of the hanger-barrel that incloses said driving bevel-wheel, as illustrated in Figs. 4 and 5.

Having thus fully described my said invention, what I claim as new, and desire to secure by Letters Patent, is—

1. The combination with the rear forks of a chainless-bicycle frame, of an attaching-bracket formed with a loop-shaped body portion provided with an intersecting attaching-sleeve at its front end, said sleeve having an open-sided formation and adapted to engage the horizontal rear fork member in a lateral manner, and means for securing said sleeve to the rear fork, said rear fork inclosing the counter-shaft of the driving-gear mechanism, substantially as set forth.

2. The combination with the rear forks of a chainless-bicycle frame, of an attaching-bracket formed with a loop-shaped body portion provided with an intersecting attaching-sleeve at its front end, said sleeve having an open-sided formation and adapted to engage the rear fork member in a lateral manner, and means for securing said sleeve to the rear fork, the same comprising fixed and adjustable collars on the rear fork, the opposing faces of which are formed to engage the ends of said attaching-sleeve, substantially as set forth.

In testimony whereof witness my hand this 17th day of April, 1899.

WILLIAM CAIRNS.

In presence of—
ROBERT BURNS,
JAMES LAVALLIN.